United States Patent
Asada

(10) Patent No.: US 9,011,991 B2
(45) Date of Patent: Apr. 21, 2015

(54) LENGTHY STRETCHED FILM, AND MANUFACTURING METHOD AND USE THEREOF

(75) Inventor: Takeshi Asada, Tokyo (JP)

(73) Assignee: Zeon Corporation, Tokyo (JP)

(*) Notice: Subject to any disclaimer, the term of this patent is extended or adjusted under 35 U.S.C. 154(b) by 1750 days.

(21) Appl. No.: 12/225,491

(22) PCT Filed: Mar. 26, 2007

(86) PCT No.: PCT/JP2007/056256
§ 371 (c)(1),
(2), (4) Date: Sep. 23, 2008

(87) PCT Pub. No.: WO2007/111313
PCT Pub. Date: Oct. 4, 2007

(65) Prior Publication Data
US 2009/0130341 A1   May 21, 2009

(30) Foreign Application Priority Data
Mar. 24, 2006   (JP) .................................. 2006-083460

(51) Int. Cl.
| C09K 19/00 | (2006.01) |
| H04N 7/00 | (2011.01) |
| B29C 55/04 | (2006.01) |

(52) U.S. Cl.
CPC ....... *B29C 55/045* (2013.01); *B29K 2995/0034* (2013.01)

(58) Field of Classification Search
None
See application file for complete search history.

(56) References Cited

U.S. PATENT DOCUMENTS

| 6,746,633 B2 | 6/2004 | Sakamaki et al. | |
| 6,814,914 B2* | 11/2004 | Tasaka et al. | 264/217 |
| 2004/0017364 A1* | 1/2004 | Tanaka et al. | 345/173 |
| 2004/0070041 A1* | 4/2004 | Obayashi et al. | 257/437 |
| 2004/0241344 A1* | 12/2004 | Kawanishi et al. | 428/1.1 |
| 2005/0151906 A1* | 7/2005 | Yoshimi et al. | 349/118 |
| 2005/0249890 A1* | 11/2005 | Murakami et al. | 428/1.1 |
| 2010/0002170 A1 | 1/2010 | Itadani et al. | |
| 2011/0097546 A1 | 4/2011 | Itadani et al. | |

FOREIGN PATENT DOCUMENTS

| EP | 1 964 662 A1 | 9/2008 |
| EP | 2 732 954 A2 | 5/2014 |
| JP | 2002-86554 A | 3/2002 |

(Continued)

OTHER PUBLICATIONS

Supplemental European Search Report dated Jun. 10, 2014 for European Patent Application No. 07 73 9694.

*Primary Examiner* — Ellen S Wood
*Assistant Examiner* — Anthony J Frost
(74) *Attorney, Agent, or Firm* — Birch, Stewart, Kolasch & Birch, LLP

(57) ABSTRACT

A lengthy stretched film made of a thermoplastic resin, having, over the width direction of at least 1300 mm, a value of an orientation angle θ to a take-up direction in a range of 40° to 50° and fluctuation thereof of 1.0° or less, and a value of an average Nz coefficient in a range of 1.3 to 2.0 and fluctuation thereof of 0.10 or less. A lengthy circularly polarizing plate constituted by laminating the lengthy stretched film with a lengthy polarizer. A reflective display type liquid crystal display device provided with the circularly polarizing plate constituted by trimming the lengthy circularly polarizing plate to a desired size.

14 Claims, 2 Drawing Sheets

(56) References Cited

FOREIGN PATENT DOCUMENTS

| | | | | |
|---|---|---|---|---|
| JP | 2003-232928 A | | 8/2003 | |
| JP | 2005010413 A | * | 1/2005 | ............... G02B 5/30 |
| JP | 2005-319660 A | | 11/2005 | |
| JP | 2005-321542 A | | 11/2005 | |
| JP | 2005-321543 A | | 11/2005 | |
| JP | 2005321542 A | * | 11/2005 | ............... G02B 5/30 |
| JP | 2006-224618 A | | 8/2006 | |
| JP | 2006-255892 A | | 9/2006 | |
| JP | 2006255892 A | * | 9/2006 | |
| JP | 2007-94007 A | | 4/2007 | |

* cited by examiner

LENGTHY STRETCHED FILM, AND MANUFACTURING METHOD AND USE THEREOF

TECHNICAL FIELD

The present invention relates to a lengthy stretched film, and manufacturing method and use thereof.

BACKGROUND ART

Various retarder films are used in liquid crystal display devices for performance increase. A retarder film is installed on the liquid crystal display so that a retardation axis is inclined by specific various angles with respect to a polarized light transmission axis of a polarizer and a polarized light transmission axis of a liquid crystal cell in order to fully exert its functions. The inclination angle of the retardation axis is an angle not in parallel with nor perpendicular to a side of the display.

As a method of obtaining a retarder film oriented not in parallel with nor perpendicular to the side, a method in which a lengthy stretched film which is obtained by orienting a transparent resin film by longitudinal stretching or lateral stretching is obliquely cut in a rectangular shape with a predetermined angle to the side of the stretched film is widely known. However, with this method, even if the maximum area is to be obtained, a lot of cutting loss is generated, and use efficiency of the stretched film is low.

On the other hand, a lengthy stretched film obliquely oriented with a predetermined angle can be cut in parallel with the side, and the use efficiency of the stretched film is increased. Various methods of obtaining such film obliquely oriented to the side by stretching have been proposed.

For example, Patent Document 1 discloses, in a stretching method of an optical polymer film in which both ends of a continuously supplied polymer film are held by a holding means and a tension is applied to stretch the film, while the holding means is advanced in the longitudinal direction, the stretching method of an optical polymer film characterized in that stretching is carried out while a relation of |L2−L1|>0.4 W is satisfied among a locus L1 of the holding means from a substantial holding start point to a substantial holding release point on one end of the polymer film, a locus L2 of the holding means from a substantial holding start point to a substantial holding release point on the other end of the polymer film and a distance W between the two substantial holding release points, bearing properties performance of the polymer film is maintained and in presence of the state of a volatile content of 5% or more, and then, the volatile content is lowered while the film is made to shrink.

Patent Document 1: Japanese Patent Laid-Open No. 2002-86554 (U.S. Pat. No. 6,746,633)

Patent Document 2 discloses a manufacturing method of a lengthy optical film obtained by stretching a lengthy film made of a thermoplastic resin and having an orientation axis being in a direction not in parallel with nor perpendicular to a take-up direction of the lengthy film, characterized in that in a region where the film is substantially stretched, traveling speeds are equal and traveling distances are different at opposing both ends in the width direction of the film, and stretching is carried out so that at least one of a pair of jigs holding the both ends in the width direction of the film moves on a rail in a corrugated shape with respect to a film surface.

Moreover, Patent Document 2 describes that the stretching step may be repeated several times or the stretching step may be carried out after stretching in the longitudinal direction or lateral direction in advance.

Patent Document 2: Japanese Patent Laid-Open No. 2003-232928

However, with these obliquely stretching methods, wrinkles or twists may occur obliquely and thickness tends to be uneven easily. Thus, it has been substantially impossible to obtain a wide film with a uniform thickness in the width direction having a width of 1300 mm or more and uniform orientation without fluctuation by an inclined orientation angle of particularly 40° or more to the take-up direction. Therefore, it has been impossible to industrially mass-produce a lengthy and wide optical film with an oblique orientation axis (direction largely offset from the width direction or longitudinal direction of the film).

DISCLOSURE OF THE INVENTION

Problems to be Solved by the Invention

In view of the above circumstances, the present invention has an object to provide a wide and lengthy stretched film which has no uneven thickness in the width direction nor fluctuation in an orientation direction, is excellent in accuracy of optical characteristics and has an orientation axis inclined in a range of predetermined angle with respect to a take-up direction and to provide a manufacturing method thereof.

Means for Solving the Problems

After keen examination in order to achieve the above object, the inventor has found out that a wide and lengthy stretched film which has no uneven thickness in the width direction nor fluctuation in an orientation angle, is excellent in accuracy of optical characteristics and has an orientation axis inclined by 40° or more to the take-up direction can be obtained by stretching a lengthy unstretched film to obtain a first stretched film A oriented with an inclination of 40° to 50° to the take-up direction and by re-stretching the first stretched film A to be oriented in a direction orthogonal to the orientation angle of the first stretched film A.

Also, the inventor has found out that a wide and lengthy stretched film which has no uneven thickness in the width direction and very little fluctuation in an orientation angle, is excellent in accuracy of optical characteristics and has an orientation axis inclined by a relatively large angle to the take-up direction can be obtained by longitudinally stretching a lengthy unstretched film made of a thermoplastic resin to obtain a first stretched film B having an orientation angle $\theta_{1B}$ to the take-up direction is in a range of ±1° and a refractive index difference Δn is in a specific range, and by tenter-stretching the first stretched film B by feeding it out at a specific angle to the take-up direction of a second stretched film B.

Moreover, the inventor has found out that it is possible to improve productivity of a polarizing plate and a liquid crystal display device by using a lengthy stretched film made of a thermoplastic resin, having an orientation angle θ in a specific angle range to the take-up direction, fluctuation in the orientation angle of 1.0° or less over the width direction of at least 1300 mm, an average Nz coefficient in a range of 1.3 to 2.0, and fluctuation of the Nz coefficient of 0.10 or less over the width direction of at least 1300 mm. The present invention has been completed based on these findings.

That is, the present invention includes the following modes:

(1) A lengthy stretched film made of a thermoplastic resin in which over the width direction of at least 1300 mm, a value of an orientation angle θ to a take-up direction is in a range of 40° to 50°;

fluctuation of the orientation angle θ to the take-up direction is 1.0° or less;

a value of Nz coefficient is in a range of 1.3 to 2.0; and fluctuation of the Nz coefficient is 0.10 or less.

(2) A manufacturing method of the lengthy stretched film comprising:

a step of stretching a lengthy unstretched film made of a thermoplastic resin to obtain a first stretched film A with an orientation angle $\theta_{1A}$ to a take-up direction in a range of 40° to 50°; and a step of re-stretching the first stretched film A to obtain a second stretched film A with an orientation angle $\theta_{2A}$ to a take-up direction in a range of $\theta_{1A}+85°$ to $\theta_{1A}+95°$.

(3) A manufacturing method of the lengthy stretched film comprising:

a step of longitudinally stretching a lengthy unstretched film made of a thermoplastic resin to obtain a first stretched film B with an orientation angle $\theta_{1B}$ to a take-up direction in a range of ±1° and a refractive index difference Δn of 0.001 to 0.003; and a step of tenter-stretching the first stretched film B while feeding it out so that a feeding-out angle $\theta_{2B}$ to a take-up direction of a second stretched film B is $15°<\theta_{2B}<\theta+5°$ to obtain the second stretched film B with an orientation angle θ to the take-up direction in a range of 40° to 50°.

(4) A lengthy circularly polarizing plate obtained by laminating the lengthy stretched film and a lengthy polarizer.

(5) A liquid crystal display device comprising a stretched film obtained by trimming the lengthy stretched film or a circularly polarizing plate obtained by trimming the lengthy circularly polarizing plate.

(6) The liquid crystal display device provided with a reflective display type liquid crystal panel.

Advantages of the Invention

Since the lengthy stretched film of the present invention can be trimmed in parallel with the longitudinal direction or the width direction, a disposal portion of the film is small, and productivity is excellent. Also, the circularly polarizing plate of the present invention can provide a liquid crystal display device or particularly a reflective liquid crystal display device in which the circularly polarizing plate is used has a display screen prevented from decreasing in contrast or coloring and a wider viewing angle of the display screen.

According to the manufacturing method of the present invention, a wide and lengthy stretched film with a uniform thickness in the width direction and an orientation axis uniformly oriented in a direction of 40° to 50° to the take-up direction can be easily obtained. The lengthy stretched film with the orientation axis obliquely oriented is suitable as a retarder for a liquid crystal display device or the like. Specifically, by using a stretched film having an oblique orientation axis to the longitudinal direction when stacking it on another lengthy optical element such as a polarizing plate used in a liquid crystal display device with an orientation axis inclined at a specific angle, roll-to-roll stacking is possible with the another lengthy optical element.

EXPLANATION OF SYMBOLS

Figure 1:
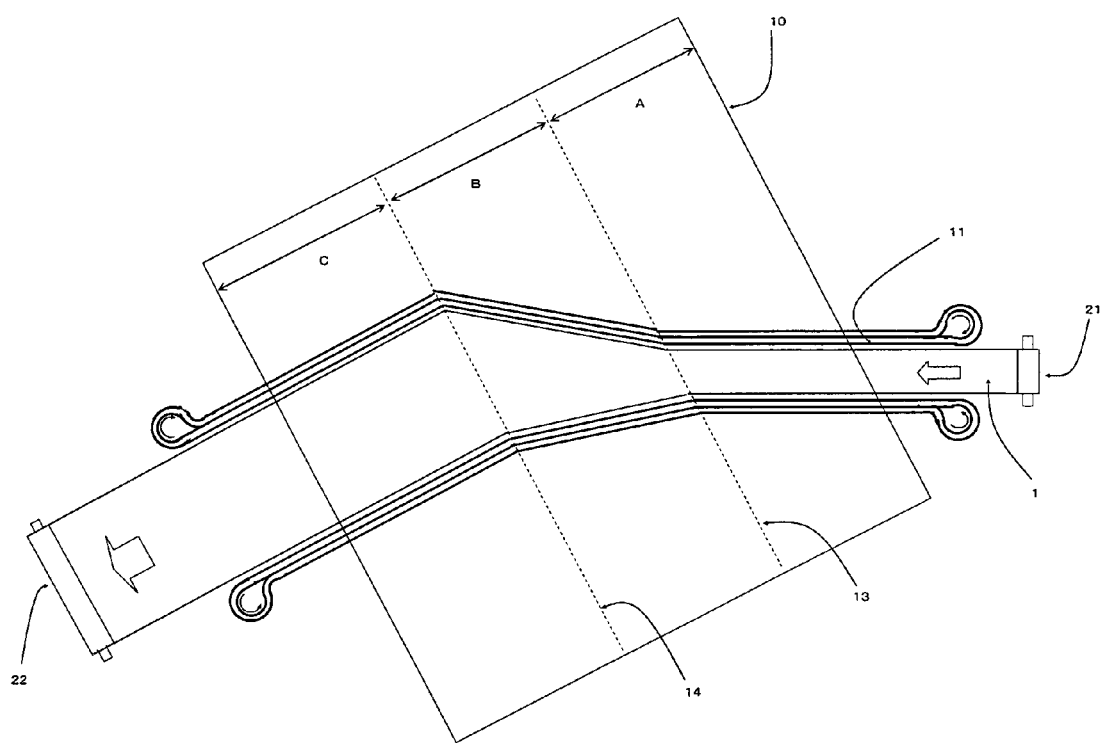
FIG. 1 is a conceptual diagram illustrating an example of a tenter stretching machine to which a manufacturing method of the present invention can be suitably applied.

1: film
10: temperature-controlled room
11: rail
12: grasping means
13: boundary between preheating zone and stretching zone
14: boundary between stretching zone and fixing zone
21: wind-off roll
22: take-up roll
47: film feeding-out direction
49: film take-up direction
S1, S2: stretching start point
E1, E2: stretching end point

BEST MODE FOR CARRYING OUT THE INVENTION

Lengthy Stretched Film

A lengthy stretched film of the present invention is made of a thermoplastic resin, in which over the width direction of at least 1300 mm, a value of an orientation angle θ to a take-up direction is in a range of 40° to 50°;

fluctuation of the orientation angle θ to the take-up direction is 1.00 or less;

a value of Nz coefficient is in a range of 1.3 to 2.0; and fluctuation of the Nz coefficient is 0.10 or less.

In the present invention, the term lengthy means those having a length of approximately 5 times or more, more preferably having a length of 10 times or more of a width direction of a film or a laminated body. Specifically, the length is such an extent that is wound in a roll state for storage or transport.

Thermoplastic resins used in the stretched film of the present invention are not particularly limited as long as it is a transparent resin and include polycarbonate resin, polyethersulphone resin, polyethylene terephthalate resin, polyimide resin, polymethylmethacrylate resin, polysulphone resin, polyarylate resin, polyethylene resin, polyvinylchloride resin, diacetylcellulose, triacetylcellulose, polystyrene resin, polyacryl resin, alicyclic olefin polymer and the like. Among them, a resin with a positive natural birefringence value is preferable and alicyclic olefin polymer is more preferable.

An alicyclic olefin polymer preferably used in the present invention is an amorphous polymer having a cycloalkane structure in a main chain and/or side chain. From the viewpoint of mechanical strength and heat resistance, a polymer having a cycloalkane structure in a main chain is preferable. The cycloalkane structure includes monocyclic, polycyclic (condensed polycyclic, cross-linked polycyclic and the like) structures. The number of carbon atoms constituting one unit of a cycloalkane structure is not particularly limited, but if it is usually 4 to 30, preferably 5 to 20, or more preferably 5 to 15, characteristics of a resin film such as mechanical strength, heat resistance, and moldability are preferably well-balanced.

Alicyclic olefin polymers include those described in Japanese Patent Laid-Open No. H05-310845, Japanese Patent Laid-Open No. H05-097978, and U.S. Pat. No. 6,511,756, for example.

A proportion of a repeating unit having an alicyclic structure constituting an alicyclic olefin polymer is preferably 55% by weight or more, more preferably 70% by weight or more, or particularly preferably 90% by weight or more. If a proportion of the repeating unit having an alicyclic structure in an alicyclic olefin polymer is within this range, it is preferable from the viewpoint of transparency and heat resistance.

Alicyclic olefin polymers include norbornene resin, monocyclic olefin resin, cyclic conjugated diene resin, vinyl alicyclic hydrocarbon resin and hydrogenated product thereof. Among them, the norbornene resin can be used preferably owing to its favorable transparency and moldability.

Norbornene resin includes, for example, a ring-opening polymer of a monomer having norbornene structure, a ring-opening copolymer of a monomer having norbornene structure and another monomer, or hydrogenated product thereof; and an addition polymer of a monomer having norbornene structure, an addition polymer of a monomer having norbornene structure and another monomer, or hydrogenated product thereof. Among them, hydrogenated product of ring-opening (co)polymer of a monomer having norbornene structure can be used particularly favorably from the viewpoint of transparency, moldability, heat resistance, low moisture absorption, dimensional stability, light weight properties and the like.

The monomer having norbornene structure includes bicyclo[2.2.1]hept-2-en (popular name: norbornene), tricyclo[4.3.0.1$^{2,5}$]deca-3,7-diene (popular name: dicyclopentadiene), 7,8-benzotricyclo[4.3.0.1$^{2,5}$]deca-3-en (popular name: methanotetrahydrofluorene), tetracyclo[4.4.0.1$^{2,5}$.1$^{7,10}$]dodeca-3-en (popular name: tetracyclododecene) and derivatives of these compounds (those having a substitute group in the ring, for example). Here, the substitute groups include an alkyl group, alkylene group, polar group and the like, for example. Also, a plurality of the same or different substitute groups may bond to a ring. The monomer having norbornene structure can be used alone or in combination of two or more.

The polar group includes heteroatom or atom group having a heteroatom. The heteroatom includes oxygen atom, nitrogen atom, sulfur atom, silicon atom, halogen atom and the like. Specific examples of the polar group include carboxyl group, carbonyloxycarbonyl group, epoxy group, hydroxyl group, oxy group, ester group, silanol group, silyl group, amino group, nitrile group, sulphone group and the like. In order to obtain a film with small saturated water absorption, the smaller amount of the polar group is the better, and no polar group is more preferable.

Other monomers capable of ring-opening copolymerization with a monomer having norbornene structure include monocyclic olefins such as cyclohexene, cycloheptene and cyclooctene, and their derivatives; cyclic conjugated diene such as cyclohexadiene and cycloheptadiene, and their derivatives.

The ring-opening polymer of a monomer having norbornene structure and the ring-opening copolymer of a monomer having norbornene structure and another monomer capable of copolymerization can be obtained by (co)polymerizing the monomer in the presence of a known ring-opening polymerization catalyst.

Other monomers capable of addition copolymerization with a monomer having norbornene structure include α-olefin with 2 to 20 carbon atoms such as ethylene, propylene and 1-butene, and their derivatives; cycloolefin such as cyclobutene, cyclopentene and cyclohexene, and their derivatives; and unconjugated diene such as 1,4-hexadiene, 4-methyl-1,4-hexadiene and 5-methyl-1,4-hexadiene, and the like.

These monomers can be used alone or in combination of two or more. Among them, α-olefin is preferable and ethylene is more preferable.

The addition polymer of a monomer having norbornene structure and the addition copolymer of a monomer having norbornene structure and another monomer capable of copolymerization can be obtained by polymerizing the monomer in the presence of a known addition polymerization catalyst.

The hydrogenated products of the ring-opening polymer of a monomer having norbornene structure, the hydrogenated products of the ring-opening copolymer of a monomer having norbornene structure and another monomer capable of ring-opening copolymerization therewith, the hydrogenated products of the addition polymer of a monomer having norbornene structure, and the hydrogenated products of the addition copolymer of a monomer having norbornene structure and another monomer capable of addition copolymerization therewith can be obtained by adding a known hydrogenation catalyst containing transition metal such as nickel, palladium and the like in a solution of the ring-opening (co)polymer or addition (co)polymer, by having hydrogen brought into contact, and by hydrogenating the carbon-carbon unsaturated bond to preferably 90% or more.

Among the norbornene resins, as the repeating unit, those having X: bicyclo[3.3.0]octane-2,4-diyl-ethylene structure and Y: tricyclo[4.3.0.1$^{2,5}$]decane-7,9-diyl-ethylene structure, contents of their repeating units being 90% by weight or more to the entire repeating unit of the norbornene resin, and a ratio between the X content and the Y content being 100:0 to 40:60 in weight ratio of X:Y are preferable. By using such resin, an optical film with no dimensional change in a long time and having excellent stability in optical characteristics can be obtained.

A molecular weight of the alicyclic olefin-polymer used in the present invention can be selected as appropriate according to its intended use, but in weight average molecular weight (Mw) of polyisoprene conversion (or polystyrene conversion if solvent is toluene) measured by gel permeation chromatography using cyclohexane as the solvent (or toluene if polymer resin is not dissolved) is usually 10,000 to 100,000, preferably 15,000 to 80,000, or more preferably 20,000 to 50,000. If the weight average molecular weight is within such range, the mechanical strength and moldability of the film is preferably well balanced.

A molecular weight distribution of the alicyclic olefin polymer, that is a ratio of weight average molecular weight (Mw)/number average molecular weight (Mn), is not particularly limited, but it is in a range of usually 1.0 to 10.0, preferably 1.1 to 4.0, or more preferably 1.2 to 3.5.

The thermoplastic resin used in the present invention has a glass transition temperature of preferably 80° C. or more, or more preferably 100 to 250° C.

Also, the thermoplastic resin has its absolute value of photoelastic coefficient of preferably $10 \times 10^{-12}$ Pa$^{-1}$ or less, more preferably of $7 \times 10^{-12}$ Pa$^{-1}$ or less, or particularly preferably of $4 \times 10^{-12}$ Pa$^{-1}$ or less. The photoelastic coefficient C is a value represented by C=Δn/σ, wherein a difference of refractive indexes is Δn and a stress is σ. By using the transparent resin with the photoelastic coefficient in this range, fluctuation in an in-plane retardation Re of a stretched film can be reduced. Moreover, by applying such stretched film to a liquid crystal display device, a phenomenon of a change in a hue at an end portion of a display screen in the liquid crystal display device can be suppressed.

The thermoplastic resin used in the present invention may be mixed with compounding agent including coloring agent such as pigment and dye, fluorescent brightening agent, dispersing agent, heat stabilizer, light stabilizer, ultraviolet absorber, antistatic agent, antioxidant, lubricant, solvent and the like as appropriate. The mixed amount of the compounding agent is not particularly limited but it is preferably 0 to 5% by weight in the thermoplastic resin.

In the present invention, the retardation Re in the in-plane direction of the stretched film is in a range of approximately 100 to 300 nm over the width direction of at least 1300 mm, but an optimal value in this range can be selected depending on a design of a display device to be used. The Re is a value obtained by multiplying a difference (difference of refractive index $\Delta n$) between a refractive index $n_x$ in a direction of an in-plane retardation axis and a refractive index $n_y$ in a direction orthogonal to the retardation axis by an average thickness d of a film (Re=$(n_x-n_y) \times d = \Delta n \times d$).

In the present invention, the fluctuation in the retardation Re in the in-plane direction of a stretched film is within preferably 10 nm, more preferably 5 nm, or particularly preferably 2 nm over the width direction of at least 1300 mm. By keeping the fluctuation of the retardation Re in the in-plane direction within the above range, when used as a retarder film for a liquid crystal display device, its display quality can be made favorable.

In retardation Re in the in-plane direction, the stretched film was measured with an interval of 50 mm in the width direction at a light incident angle of 0° (state where an incident light beam is orthogonal to a surface of the stretched film of the present invention) using a commercial phase difference measuring device and average of readings is made retardation Re in the in-plane direction. Also, fluctuation in the retardation Re in the in-plane direction is a value obtained by subtracting a minimum value from a maximum value of each measured value.

In the stretched film of the present invention, its orientation angle $\theta$ is in a range of 40° to 50° when a take-up direction of the film is 0°, and an optimal value is selected in this range depending on the design of a display device to be used, similarly to the retardation value Re in the in-plane direction.

In the stretched film of the present invention, the fluctuation in the orientation angle $\theta$ is 1.0° or less, or preferably 0.8° or less over the width direction of at least 1300 mm. If a stretched film with the fluctuation in the orientation angle exceeding 1.0° is bonded with a polarizing plate to obtain a circularly polarizing plate and the plate is installed at a liquid crystal display device, light leakage might occur and contrast might be deteriorated.

The orientation angle $\theta$ is an average value of values obtained by measuring a stretched film with an interval of 50 mm in the width direction using a commercial polarizing microscope. Also, the fluctuation in the orientation angle $\theta$ is a value obtained by subtracting a minimum value from a maximum value of each measured value.

In the stretched film of the present invention, an Nz coefficient represented by $(n_x-n_z)/(n_x-n_y)$ when the refractive index in the retardation axis direction in the film plane is $n_x$, the refractive index in a direction orthogonal to the retardation axis in the film plane is $n_y$, the refractive index in the film thickness direction is $n_z$ is in a range of 1.3 to 2.0, preferably in a range of 1.4 to 2.0, or more preferably in a range of 1.7 to 2.0. An optimal value in this range is selected depending on the design of a liquid crystal display device.

In the stretched film of the present invention, the fluctuation of the Nz coefficient is 0.10 or less, or preferably 0.08 or less over the width direction of at least 1300 mm. If the fluctuation of the Nz coefficient exceeds 0.10, it causes deterioration in display quality such as color unevenness when installed in a liquid crystal display device.

The Nz coefficient is an average value of values obtained by measuring the stretched film with an interval of 50 mm in the width direction using a commercial phase difference measuring device. Also, the fluctuation of the Nz coefficient is a value obtained by subtracting a minimum value from a maximum value of each measured value.

The average thickness of the stretched film of the present invention is in a range of preferably 30 to 80 µm, more preferably 30 to 60 µm, or particularly preferably 30 to 50 µm over the width direction of at least 1300 mm from the viewpoint of mechanical strength and the like.

Also, since the thickness fluctuation in the width direction affects success of taking-up, it is preferably 3 µm or less, or particularly preferably 2 µm or less over the width direction of at least 1300 mm.

The average thickness is an average value of values obtained by measuring the stretched film with an interval of 50 mm in the width direction using a commercial thickness measuring device. Also, the thickness fluctuation is a value obtained by subtracting a minimum value from a maximum value of each measured value.

The lengthy stretched film of the present invention has a width of at least 1300 mm, or preferably at least 1500 mm. The upper limit of width of the lengthy stretched film of the present invention is not particularly limited but it is 2000 mm. The lengthy stretched film of the present invention is produced by accordingly trimming both ends in the width direction after being stretched during its manufacturing process, but in this case, the width of the film mentioned above may be a dimension after the both ends are trimmed.

In the stretched film of the present invention, a content of a residual volatile component is preferably 0.1% by weight or less, more preferably 0.05% by weight or less, or further preferably 0.02% by weight or less. If the content of a residual volatile component is too large, there is a fear that its optical characteristics will change over time. By keeping the content of the volatile component in the above range, dimensional stability is improved, variation with time in the retardation Re in the in-plane direction and the retardation Rth (=$((n_x+n_y)/2-n_z) \times d$; $n_x$ is a refractive index in the in-plane retardation axis direction; $n_y$ is a refractive index in a direction orthogonal to the retardation axis in the plane; $n_z$ is a refractive index in a thickness direction; d is an average thickness of a film) can be reduced, and moreover, deterioration of a circularly polarizing plate or liquid crystal display device of the present invention can be suppressed, which can keep display image stable and favorable for a long time.

The volatile component is a substance with a molecular weight of 200 or less, and includes a residual monomer, solvent or the like, for example. The content of the volatile component can be quantified by dissolving the film in chloroform and analyzing it using gas chromatography as a total of substances with the molecular weight of 200 or less contained in the film.

In the stretched film of the present invention, a saturated water absorption is preferably 0.03% by weight or less, more preferably 0.02% by weight or less, or particularly preferably 0.01% by weight or less. By having the saturated water absorption in the above range, variation with time in the retardation Re in the in-plane direction and the retardation Rth in the thickness direction can be reduced, and moreover, deterioration of a circularly polarizing plate or liquid crystal display device can be suppressed, which can keep the display image stable and favorable for a long time.

The saturated water absorption, within JIS K7209, is a value decided by dipping a test film in water with a temperature of 23° C. for 24 hours and by acquiring mass change of the test film, that is, by measuring a difference in the mass before and after dipping, and representing it in percentage to the mass before dipping.

[Manufacturing Method of a Lengthy Stretched Film]

A preferable manufacturing method of a stretched film of the present invention includes:

(A) a manufacturing method of a lengthy stretched film comprising:

a step of stretching a lengthy unstretched film made of a thermoplastic resin to obtain a first stretched film A with an orientation angle $\theta_{1A}$ to a take-up direction in a range of 40° to 50°; and a step of re-stretching the first stretched film A to obtain a second stretched film A with an orientation angle $\theta_{2A}$ to a take-up direction in a range of $\theta_{1A}+85°$ to $\theta_{1A}+95°$; and (B) a manufacturing method of a lengthy stretched film comprising:

a step of longitudinally stretching a lengthy unstretched film made of a thermoplastic resin to obtain a first stretched film B with an orientation angle $\theta_{1B}$ to a take-up direction in a range of ±1° and a refractive index difference Δn in a range of 0.001 to 0.003; and a step of tenter-stretching the first stretched film B while feeding it out so that a feeding-out angle $\theta_{2B}$ to a take-up direction of a second stretched film B is $15°<\theta_{2B}<\theta+5°$ to obtain the second stretched film B with an orientation angle θ to the take-up direction in a range of 40° to 50°.

[Manufacturing Method (A) of a Lengthy Stretched Film]

In the manufacturing method (A) of a stretched film of the present invention, first, a lengthy unstretched film made of a thermoplastic resin is stretched to form a first stretched film A with the orientation angle $\theta_{1A}$ to a take-up direction in a range of 40° to 50° (first stretching step A). If the angle $\theta_{1A}$ is out of the above range, thickness fluctuation or fluctuation in orientation angle profile in the width direction is increased, and a wide stretched film can not be obtained.

The lengthy unstretched film can be obtained by a known method such as cast molding, extrusion molding, inflation molding and the like, for example. Among them, extrusion molding is preferable since its residual volatile component amount is small and dimensional stability is excellent. The unstretched film may be a single-layer film or a laminate film of two or more layers. The laminate film can be obtained by a known method such as coextrusion molding, film lamination, paint and the like. Among them, coextrusion molding is preferable.

The width of the lengthy unstretched film used in the present invention may be determined by a material constituting the stretched film, a width of the stretched film, stretching magnification and the like, but it is preferably at least 1000 mm.

In order to have inclination of an orientation axis to a take-up direction (orientation angle) $\theta_{1A}$ at 40° to 50°, a known obliquely stretching method is usually used.

The obliquely stretching method is a method of stretching in a oblique direction usually using a tenter stretching machine. The first stretched film A obtained by a usual obliquely stretching method has thickness fluctuation and optical characteristics fluctuation in the width direction is large, but by applying obliquely stretching in the subsequent second stretching step A, the thickness fluctuation and the optical characteristics fluctuation can be made smaller.

In the preferable first stretching step A, continuous stretching is applied by a tenter stretching machine having a rail layout in which a direction to feed an unstretched film out of a winding body to a take-up direction (MD direction) of the first stretched film A is inclined by 40° to 50°. In this description, the angle of the film feeding-out direction to the film take-up direction is referred to as a feeding-out angle.

The stretching magnification $R_{1A}$ in the first stretching step A is preferably 1.3 to 3.0, or more preferably 1.5 to 2.5. If the stretching magnification is in this range, the thickness fluctuation in the width direction is reduced.

The stretching magnification $R_{1A}$ in the first stretching step A can be obtained from a length change amount in the width direction. When the width of the film before stretching is $W_0$ and the width of the film after stretching is $W_1$, the stretching magnification can be obtained by $W_1/W_0$. The stretching magnification $R_{2A}$ in the second stretching step A, which will be described later, can be also obtained by the similar method.

A stretching temperature in the first stretching step A is selected as appropriate from a range of Tg (° C.) or more and Tg+30 (° C.) or less in a glass transition temperature Tg (° C.) of the thermoplastic resin constituting the film. If the stretching temperature is lower than Tg (° C.), moldability is not enough and a defect such as craze might be generated. On the contrary, if the temperature is higher than Tg+30 (° C.), it causes flow stretching and a refractive index difference Δn in an available size can not be obtained easily.

Also, in the first stretching step A, it is preferable that a stretching temperature is made different in the width direction in a stretching zone of the tenter stretching machine. A method of giving a temperature difference in the width direction of the stretching zone is not particularly limited and includes a method of adjusting an opening degree of a nozzle for feeding hot air into a temperature-controlled room of the tenter stretching machine; a method of output control in a width direction by arranging infrared heaters in the width direction and the like, for example.

Next, the first stretched film A obtained in the first stretching step A is stretched again so that the orientation angle $\theta_{2A}$ falls within a range of $\theta_{1A}+85°$ to $\theta_{1A}+95°$ (second stretching step A).

In the second stretching step A, obliquely stretching is applied by the tenter stretching machine similar to the first stretching step A.

In the preferable second stretching step A, continuous stretching is applied by the tenter stretching machine having a rail layout with the direction to feed the first stretched film A out of the winding body to the take-up direction of the second stretched film A (MD direction) at $\theta_{1A}+85°$ to $\theta_{1A}+95°$, more specifically, at 130° to 140° (40° to 50° by an angle in the reverse). If the first stretched film A obtained by the first stretching step A has the orientation angle $\theta_{1A}=45°$, without changing the rail layout of the tenter stretching machine, only by reversing the first stretched film A and applying obliquely stretching with the same condition as that of the first stretching step A, the orientation angle $\theta_{2A}$ can be made $\theta_{1A}+90°$, that is 135° (45° by an angle in the reverse).

The stretching magnification $R_{2A}$ in the second stretching step A is preferably 1.3 to 3.0, or more preferably 1.5 to 2.5. If the stretching magnification is within this range, the thickness fluctuation in the width direction is small.

The stretching temperature in the second stretching step A is selected as appropriate from a range of Tg (° C.) or more and Tg+30 (° C.) or less to a glass transition temperature Tg (° C.) of the thermoplastic resin constituting the film. If the stretching temperature is lower than Tg (° C.), moldability is not enough and a defect such as craze might be generated. On the contrary, if the temperature is higher than Tg+30 (° C.), it causes flow stretching and sufficient molecular orientation to bring about a targeted in-plane retardation Re can not be obtained.

Also, in the second stretching step A, it is preferable to apply a difference in the stretching temperature in the width direction in the stretching zone of the tenter stretching machine similarly to the first stretching step.

After the above steps, both ends of a film grasped by the grasping means of the tenter stretching machine are trimmed and then, taken up by a winding core so as to have a winding body of the stretched film of the present invention.

[Manufacturing Method of a Lengthy Stretched Film (B)]

In the manufacturing method of the stretched film (B) of the present invention, first, a lengthy unstretched film made of a thermoplastic resin is longitudinally stretched so as to obtain a first stretched film B with the orientation angle $\theta_{1B}$ to a take-up direction within a range of ±1° and refractive index difference Δn within a range of 0.001 to 0.003 (first stretching step B).

The thermoplastic resin constituting the lengthy unstretched film used in the manufacturing method (B) of the present invention includes those similar to the ones described in the lengthy stretched film of the present invention.

The lengthy unstretched film can be obtained by a known method such as cast molding, extrusion molding, inflation molding and the like, for example. Among them, extrusion molding is preferable since its residual volatile component amount is small and dimensional stability is excellent. The unstretched film may be a single-layer film or a laminate film of two or more layers. The laminate film can be obtained by a known method such as coextrusion molding, film lamination, paint and the like. Among them, coextrusion molding is preferable. It is necessary to make the thickness fluctuation of the unstretched film as small as possible in order to make the optical characteristics uniform after stretching, and it is 3 μm or less, or more preferably 2 μm or less in a value of the maximum value–the minimum value.

In the first stretching step B, a known longitudinal stretching method is used. For example, it is possible to use a method of stretching a heated film in a flow direction using a difference in peripheral speeds between rolls. Heating means includes a method of heating a roll itself by heating a heat media circulated in the roll, a method of installing an infrared heater between the rolls, a method of installing a float-type oven between the rolls and the like. Among them, the float method capable of uniform stretching is preferable.

The stretching magnification $R_{1B}$ in the first stretching step B is preferably 1.1 to 2.0, or more preferably 1.2 to 1.8. If the stretching magnification is within this range, the thickness fluctuation in the width direction and fluctuation in the orientation angle of the first stretched film B can be suppressed. Here, the stretching magnification $R_{1B}$ in the first stretching step B is a value represented by $R_{1B}=(T0/T1)^2$, when the film thickness before stretching is $T_0$ and the thickness after stretching is $T_1$ in the first stretching step.

The stretching temperature in the first stretching step B is selected as appropriate from a range of Tg (° C.) or more and Tg+30 (° C.) or less to the glass transition temperature Tg (° C.) of the thermoplastic resin constituting the unstretched film. If the stretching temperature is lower than Tg (° C.), moldability is not enough and a defect such as craze might be generated. On the contrary, if the temperature is higher than Tg+30 (° C.), it causes flow stretching and the refractive index difference Δn in an available size can not be obtained easily.

The first stretched film B has the orientation angle $\theta_{1B}$ to the take-up direction within a range of ±1° and the refractive index difference Δn within a range of 0.001 to 0.003. The orientation angle $\theta_{1B}$ is a smaller angle in the angles formed by the film take-up direction and the orientation axis. If the refractive index difference Δn of the first stretched film is less than 0.001 or more than 0.003 and the obliquely stretching having a large orientation angle as in the present invention in the second stretching step is carried out, it is difficult to obtain uniformity of the orientation angle particularly in the width direction.

The first stretched film B may be taken up by a winding core to have a winding body and then, supplied to the second stretching step B, which will be described later, or may be supplied to the second stretching step B without taking it up around the winding core.

In the second stretching step B, the first stretched film B is fed out so that the feeding-out angle $\theta_{2B}$ of the first stretched film B to the take-up direction of the second stretched film B is 15°<$\theta_{2B}$<θ+5° while being tenter-stretched so as to produce the second stretched film B with the orientation angle θ to the take-up direction in the range of 40° to 50°.

In the second stretching step B, the feeding-out angle $\theta_{2B}$ of the first stretched film B to the take-up direction of the second stretched film B is set so that it is 15°<$\theta_{2B}$<θ+5°, or preferably 20°<$\theta_{2B}$<θ+3° to the obtained orientation angle θ of the obtained second stretched film B. By keeping the feeding-out angle $\theta_{2B}$ in this range, wide and uniform physical characteristics can be obtained also by the obliquely stretched film having a large orientation angle as in the present invention.

The stretching magnification $R_{2B}$ in the second stretching step B is preferably 1.3 to 2.0, or more preferably 1.5 to 1.8. If the stretching magnification $R_{2B}$ is within this range, the thickness fluctuation in the width direction can be reduced.

The magnification $R_{2B}$ in the second stretching step B can be obtained from a length change amount in the width direction. Specifically, the stretching magnification can be obtained by $W_1/W_0$, when the width of the film before stretching is $W_0$ and the width of the film after stretching is $W_1$.

In the second stretching step B, by applying a difference to stretching temperature in the width direction in a stretching zone of the tenter stretching machine, the thickness fluctuation in the width direction can be improved to a more favorable level. A method of applying a stretching temperature difference in the width direction includes a known method such as a method of adjusting an opening degree of a nozzle for feeding hot air into a temperature-controlled room so that the degree is different in the width direction, a method of heating control by arranging heaters in the width direction and the like.

The stretching temperature in the second stretching step B is selected as appropriate from a range of Tg (° C.) or more and Tg+30 (° C.) or less to a glass transition temperature Tg (° C.) of the thermoplastic resin constituting the film. If the stretching temperature is lower than Tg (° C.), moldability is not enough and a defect such as craze might be generated. On the contrary, if the temperature is higher than Tg+30 (° C.), it causes flow stretching and sufficient molecular orientation to bring about a targeted in-plane retardation Re can not be obtained.

The second stretching step B will be described referring to the attached drawings.

Figure 2:
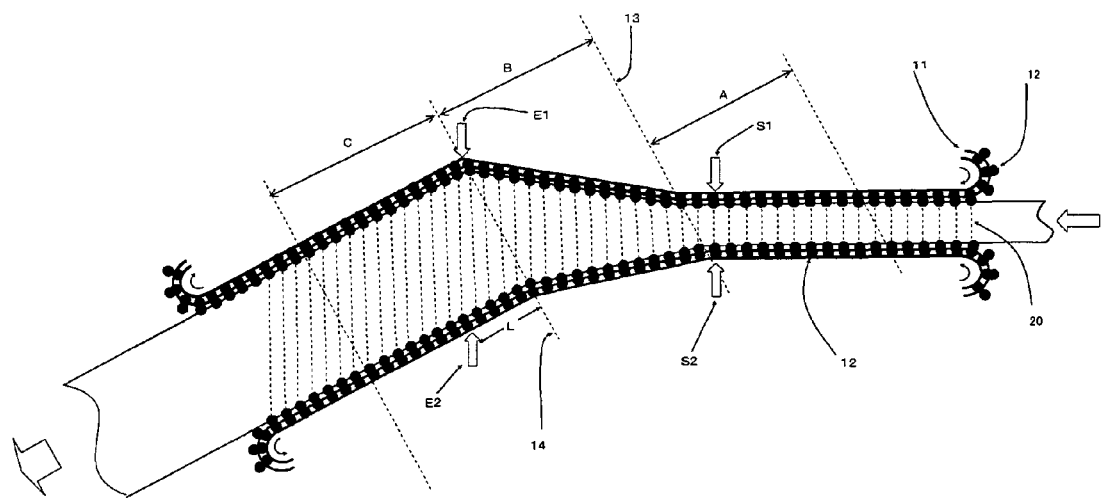
FIG. 2 is a diagram illustrating grasping means on a rail portion in the stretching machine in FIG. 1.
Figure 3:
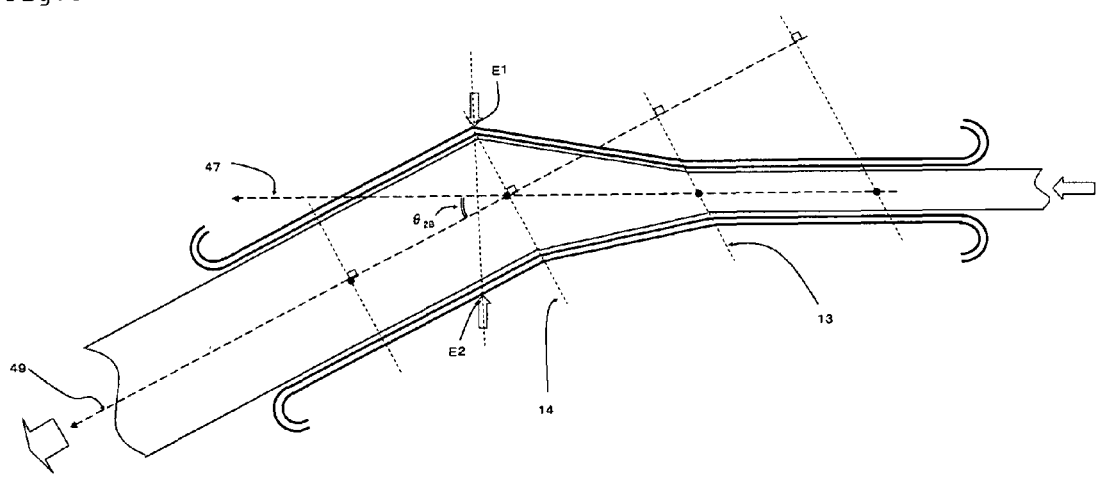
FIG. 3 is a diagram for explaining rail layout in the stretching machine in FIG. 1.

FIG. 1 is a conceptual diagram illustrating an example of a tenter stretching machine that can preferably embody the manufacturing method of the present invention. FIG. 2 is a diagram illustrating grasping means of a rail portion in the stretching machine in FIG. 1. FIG. 3 is a diagram for explaining a rail pattern in the stretching machine in FIG. 1. The angle $\theta_{2B}$ is a feeding-out angle to the film take-up direction.

The tenter stretching machine shown in FIG. 1 comprises at least a wind-off roll (first stretched film B winding body) 21, a take-up roll 22, a temperature-controlled room 10 having a preheating zone A, a stretching zone B and a fixing zone C, a rail 11 on which a grasping means travels to transport the film and the grasping means 12 (the grasping means is not shown in FIGS. 1 and 3).

The grasping means 12 grasps the both ends of the first stretched film B drawn from the wind-off roll 21, guides the first stretched film B into the temperature-controlled room having the preheating zone A, the stretching zone B and the fixing zone C and obliquely stretches it. And the second stretched film B is released in front of the take-up roll 22. The second stretched film B released from the grasping means is taken up by the take-up roll 22. The pair of right and left rails 11 have a continuous endless track without a terminal and returns the grasping means having traveled as above from an outlet side to an inlet side of the temperature-controlled room.

The first stretched film B (noted as 1 in FIG. 1) is stretched by a tension from the grasping means while passing through the temperature-controlled room having the preheating zone, the stretching zone and the fixing zone.

In the preheating zone, the stretching zone and the fixing zone, a temperature can be set independently and the temperature is usually kept constant in each zone. The temperature of each zone can be selected as appropriate, but with respect to the glass transition temperature Tg (° C.) of the thermoplastic resin constituting the unstretched film, the preheating zone has Tg to Tg+30 (° C.), the stretching zone has Tg to Tg+20 (° C.), and the fixing zone has Tg to Tg+15 (° C.).

In the present invention, a temperature difference may be applied in the width direction in the stretching zone for suppressing thickness fluctuation in the width direction. Particularly in the present invention, the temperature close to the grasping means is preferably set higher than that at the film center portion. In order to apply the temperature difference in the width direction of the stretching zone, a known method such as a method of adjusting an opening degree of a nozzle for feeding hot air into the temperature-controlled room so that the degree is different depending on the width direction or arranging heaters in the width direction for heating control can be used. The lengths of the preheating zone, the stretching zone, and the fixing zone can be selected as appropriate, and with respect to the length of the stretching zone, the length of the preheating zone is usually 100 to 150% and the length of the fixing zone is usually 50 to 100%.

The grasping means 12 travels on the rail 11 capable of deformation of arrangement, for example. The rail 11 is arranged so that the film is stretched with the desired angle. In FIG. 1, the rail arrangement is set so that the film running direction is made as will be described later. In the present invention, the film running direction is a direction of a tangent line of a line connecting mid points in the film width direction from the film wind-off roll to the film take-up roll.

At a boundary 13 between the preheating zone and the stretching zone and a boundary 14 between the stretching zone and the fixing zone, a partition plate having a slit though which the film can pass is installed. The boundary between the preheating zone and the stretching zone and the boundary between the stretching zone and the fixing zone, that is, the partition plates are preferably at right angles to a film running direction 49 in the fixing zone.

The preheating zone A is a zone for transporting the film while warming the film without substantially changing the film length in a direction orthogonal to a film running direction 47 in the preheating zone. The film running direction in the preheating zone is a direction in parallel with the direction where the film is fed out and it is usually orthogonalized the rotating shaft of the wind-off roll.

The stretching zone B is a zone for transporting the film while increasing the film length in a direction orthogonal to the film running direction in the stretching zone. The film running direction in the stretching zone is, in the rail arrangement where the stretching zone is widened at a given angle without changing its inclination as in FIG. 1, a direction of a straight line connecting a mid point of the film at the boundary between the preheating zone and the stretching zone to a mid point of the film in the boundary between the stretching zone and the fixing zone.

The film running direction in the stretching zone matches the film running direction 47 in the preheating zone in FIG. 1, but it may be offset. In the case of offset, it is preferable to offset the direction upward from the film running direction in the preheating zone in FIG. 1.

The fixing zone C is a zone for transporting the film while cooling the film without substantially changing the film length in a direction orthogonal to the film running direction 49 in the fixing zone. The film running direction 49 in the fixing zone is a direction parallel with the direction in which the film is taken up and it is usually orthogonalized a rotating shaft of the take-up roll.

In the manufacturing method of the present invention, film faces in the preheating zone, stretching zone and fixing zone are preferably substantially parallel with each other. That is, the film fed out of the wind-off roll preferably passes the preheating zone, stretching zone and fixing zone without being twisted but staying flat and is wound up by the take-up roll.

In the manufacturing method of the present invention, traveling speeds of the grasping means are substantially equal at both ends of the film. In FIG. 2, a broken line is shown between the opposing pair of grasping means. Stretching starts in the vicinity of the stretching start point and ends in the vicinity of the stretching end point. The stretching start point is a point where a distance between the pair of grasping means begins to be widened and it is S1 and S2 in FIG. 2. The stretching end point is a point where a distance between the pair of grasping means begins to be constant and it is E1 and E2 in FIG. 2.

The traveling speed of the grasping means can be selected as appropriate but it is usually 10 to 100 m/minute. A difference in traveling speeds of the right and left pair of grasping means is usually 1% or less, preferably 0.5% or less, or more preferably 0.1% or less to the traveling speed.

As shown in FIG. 3, the running direction (film feeding-out direction) 47 of the preheating zone is inclined by an angle $\theta_{2B}$ to the film running direction (film take-up direction) 49 of the fixing zone. The rail is bent downward in FIG. 3, but it may be bent upward in line symmetry with the line of the film running direction of the preheating zone in FIG. 3 as its axis. The feeding-out angle $\theta_{2B}$ is in a range of $15°<\theta_{2B}<\theta+5°$ or preferably of $20°<\theta_{2B}<\theta+3°$ to the orientation angle $\theta$ of the second stretched film B.

The stretching zone may be straight without change in the film running direction or the film running direction may be changed in a stepped manner or continuously. The opening angle of the rail can be selected as appropriate according to the stretching magnification.

The running direction of the fixing zone (film take-up direction) is inclined from the running direction (film feeding-out direction) of the preheating zone by an angle of $\theta_{2B}$ as shown in FIG. 3. Thus, in the figure, the upper grasping means takes a longer route than the lower grasping means. Therefore, in FIG. 2, when the upper grasping means reaches the point E1, the corresponding lower grasping means has already reached the point E2. When seen from the film width direction of the fixing zone, E2 advances to a position ahead of E1.

The stretched film having passed through the temperature-controlled room as above is released from the grasping means in front of the take-up roll and wound up by the take-up roll. Alternatively, the both ends of the film having been grasped by the grasping means of the tenter stretching machine may be trimmed before being wound up by the take-up roll as necessary. Alternatively, before taking up, with a purpose of preventing blocking between the films, a masking film may be overlapped and wound up at the same time or may be wound up while a tape or the like is affixed to at least one or preferably both of the ends of the stretched film. The masking film is not particularly limited as long as it can protect the film and includes polyethylene terephthalate film, polyethylene film, polypropylene film and the like, for example.

The stretched film of the present invention can be obtained easily by the above manufacturing method and since it is capable of high-level compensation of birefringence, it can be widely applied to a liquid crystal display device, an organic EL display device, a plasma display device, a FED (Field Emission Display) display device, a SED (Surface-conduction Electron-emitter Display) display device and the like, alone or in combination with other members as a retarder and a viewing-angle compensation film.

The lengthy circularly polarizing plate of the present invention is obtained by laminating the lengthy stretched film of the present invention and a lengthy polarizer.

The polarizer used in the present invention transmits one of two straight polarized lights crossing each other at a right angle. For example, a polarizer obtained by having iodine or dichroic substances such as dichroic dye adsorbed to a hydrophilic polymer film such as a polyvinyl alcohol film and partially saponified ethylene-vinyl acetate film and the like and then, uniaxially stretched, or the one obtained by uniaxially stretching the hydrophilic polymer film and having dichroic substance adsorbed or a polyene oriented film such as dehydrated polyvinyl alcohol or dehydrochlorinated polyvinyl chloride and the like can be cited. In addition, reflective polarizers such as grid polarizer and anisotropic multi-layer film can be cited. The thickness of the polarizer is usually 5 to 80 μm.

With regard to the lamination form, the stretched film of the present invention may be laminated on both faces or one face of a polarizer, and the number of laminating layers is not particularly limited and two or more layers may be laminated. If the stretched film of the present invention is laminated only on one face of the polarizer, a conventional protective film may be laminated on the other face with a purpose of protecting the polarizer.

As the conventional protective film, an appropriate transparent film may be used. Among them, a film comprising a resin with excellent transparency, mechanical strength, thermal stability, water shielding performance and the like is preferably used. Examples of such a resin include acetate polymer such as triacetylcellulose, alicyclic olefin polymer, linear chain polyolefin, polycarbonate, polyester such as polyethylene terephthalate, polyvinyl chloride, polystyrene, polyacrylonitrile, polysulphone, polyethersulphone, polyamide, polyimide, acrylic polymer and the like.

A suitable manufacturing method for obtaining a lengthy circularly polarizing plate of the present invention is a method comprising close contact between a stretched film and a polarizer while feeding them out from a winding body of the stretched film of the present invention and a polarizer winding body, respectively, at the same time. An adhesive may be interposed in a close-contact face between the obliquely stretched film and the polarizer. As a method of bringing the stretched film and the polarizer into close contact, a method of inserting the stretched film and the polarizer together into a nip of two rolls aligned in parallel for pressure sandwiching.

The lengthy stretched film or lengthy circularly polarizing plate of the present invention is used as a retarder or a polarizing plate by cutting it into a desired size according to its use form. In this case, it is preferable to cut out along a direction perpendicular or parallel to the take-up direction of the lengthy film.

A liquid crystal display device of the present invention is provided with the cut out circularly polarizing plate.

An example of the liquid crystal display device of the present invention includes a device constituted by a liquid crystal cell whose polarized light transmission axis can be changed by adjustment of an electric voltage and the above-mentioned circularly polarizing plate arranged so as to sandwich it. Also, the above-mentioned stretched film is used in a liquid crystal display device as a retarder for optical compensation, polarized light conversion and the like. The liquid crystal display device is usually provided with a backlight device for a transmission type liquid crystal display device or a reflecting plate for reflective type liquid crystal display device on the back side of a display face in order to feed light into the liquid crystal cell. The back light device includes cold cathode-ray tube, mercury plane lamp, light-emitting diode, EL and the like.

The liquid crystal cell provided at the liquid crystal display device is not particularly limited by its display mode. For example, In Plane Switching (IPS) mode, Vertical Alignment (VA) mode, Multi-domain Vertical Alignment (MVA) mode, Continuous Pinwheele Alignment (CPA) mode, Hybrid Alignment Nematic (HAN) mode, Twisted Nematic (TN) mode, Super Twisted Nematic (STN) mode, Optical Compensated Bend (OCB) mode and the like can be cited.

The liquid crystal display device is roughly classified into reflective type, transmissive type, and semi-transmissive type according to how to take in light. In the transmissive type, a backlight to be a light source is arranged behind the liquid crystal panel so that light from the backlight transmitted through the liquid crystal panel can be visually recognized by an observer. On the other hand, in the reflective type, external light is taken in from a front face of the liquid crystal display device, reflected by a reflector behind the liquid crystal panel and the reflected light is transmitted through the liquid crystal panel to be visually recognized by the observer. The semi-transmissive type is configured to operate as the reflective type when there is external light and as the transmissive type when there is no external light.

The stretched film or circularly polarizing plate of the present invention is preferable in the reflective type liquid crystal display device since the viewing angle of its display screen is widened and deterioration in contrast or coloring of the display screen can be prevented.

The liquid crystal display device of the present invention may be provided with another member. A member such as prism array sheet, lens array sheet, light diffusing plate, light guide plate, diffusion sheet, brightness improving film and the like may be arranged in one or two layers or more at an appropriate position, for example.

EXAMPLES

The present invention will be described in more detail illustrating examples and comparative examples but the present invention is not limited to the examples below. Evaluation is made by the following method in this example.

(1) Thickness

A thickness was measured with an interval of 50 mm in the width direction using a snap gauge (by Mitutoyo Corporation, ID-C112BS) and an average value T (μm) was acquired. Next, the thickness fluctuation was set as a difference between the maximum value and the minimum value of the thickness.

(2) Orientation Angle

Measurement was made with an interval of 50 mm in the film width direction using a polarizing microscope BX51 by Olympus Corporation and its average value was made an orientation angle θ. The orientation angle fluctuation was set as a difference between the maximum value and the minimum value of the orientation angle.

(3) Re and Nz Coefficient

Retardation and Nz coefficient were measured with an interval of 50 mm in the film width direction using a phase difference meter (by Oji Scientific Instruments, KOBRA-21ADH) and their average values were made Re and Nz coefficient, respectively. The Nz coefficient fluctuation was set as a difference between the maximum value and the minimum value of the Nz coefficient.

Example 1A

A pellet of ZEONOR 1420 (by Zeon Corporation), which is a norbornene resin, was dried at 100° C. for 5 hours.

The pellet was supplied to an extrusion machine, melted in the extrusion machine, extruded from a T-die through a polymer pipe and a polymer filter into a sheet-shaped body on a casting drum, and cooled so as to obtain an unstretched film with a thickness of 130 μm.

The unstretched film as-is was continuously supplied to a tenter stretching machine, and first stretching was applied with feeding-out angle of 45°, stretching temperature of 140° C., and stretching magnification of 1.3 times so as to obtain a first stretched film obliquely oriented at an average angle $\theta_{1A}=45°$ to take-up direction, and it was taken up by a winding core.

The first stretched film was reversed and supplied to a tenter stretching machine so that orientation is made in a direction by 90° to the orientation angle $\theta_{1A}$ of the first stretched film, second stretching was applied with feeding-out angle of 45°, stretching temperature of 145° C., and stretching magnification of 2.0 times, both ends of the film were trimmed by 150 mm to obtain a lengthy second stretched film with width of 1340 mm. The obtained lengthy second stretched film was uniform to the width direction. In-plane retardation Re, orientation angle, orientation angle fluctuation, Nz coefficient, and Nz coefficient fluctuation of the second stretched film are shown in Table 1.

A lengthy polarizing plate (by Sanritz Corporation, HLC2-5618S, thickness of 180 μm) with a transmission axis in the width direction was affixed to the second stretched film in a roll-to-roll manner so as to have a winding body of a circularly polarizing plate with the width of 1340 mm. The circularly polarizing plate cut out of the winding body was installed to replace a polarizing plate on a backlight side of a commercial reflective type liquid crystal display device in VA (Vertical Alignment) mode and incorporated so that the side on which the second stretched film was bonded was arranged on the liquid crystal cell side. When display characteristics of the obtained liquid crystal display device was visually checked from the front, color fluctuation was not observed on the entire width and display was favorable.

Example 2A

A second stretched film, a circularly polarizing plate and a reflective type liquid crystal display device were obtained similarly to the Example 1A except the change in the stretching conditions as shown in Table 1. The evaluation result of the second stretched film is shown in Table 1. In the reflective type liquid crystal display device using the second stretched film, no color fluctuation was observed on the entire width and display was favorable.

Example 3A

A second stretched film, a circularly polarizing plate and a reflective type liquid crystal display device were obtained similarly to the Example 1A except the change in the stretching conditions as shown in Table 1. The evaluation result of the second stretched film is shown in Table 1. In the reflective type liquid crystal display device using the second stretched film, no color fluctuation was observed on the entire width and display was favorable.

Comparative Example 1A

The unstretched film as-is was continuously supplied to the tenter stretching machine, and first stretching was applied with feeding-out angle of 45°, stretching temperature of 143° C., and stretching magnification of 2.1 times so as to obtain a first stretched film obliquely oriented at an orientation angle $\theta_{1A}=45°$ to the take-up direction, and it was taken up by a winding core. The evaluation result of the first stretched film is shown in Table 1. The first stretched film obtained by only one stretching had insufficient uniformity. In the reflective type liquid crystal display device using the first stretched film, color fluctuation was observed at end portions of the screen.

Comparative Example 2A

A first stretched film with the orientation angle $\theta_{1A}=35°$ was obtained by carrying out first stretching with the condition shown in Table 1 and a second stretched film was obtained by applying a second stretching of the first stretched film similarly to the Example 1A. The evaluation result of the second stretched film is shown in Table 1. The second stretched film had insufficient uniformity. In the reflective type liquid crystal display device using the first stretched film, color fluctuation was observed at end portions of the screen.

Comparative Example 3A

A first stretched film with the orientation angle $\theta_{1A}=55°$ was obtained by carrying out first stretching with the condition shown in Table 1 and a second stretched film was obtained by applying second stretching of the first stretched film similarly to the Example 1A. The evaluation result of the second stretched film is shown in Table 1. The second stretched film had insufficient uniformity. In the reflective type liquid crystal display device using the second stretched film, color fluctuation was observed at end portions of the screen.

TABLE 1

|  |  | Ex. 1A | Ex. 2A | Ex. 3A | Comp. Ex. 1A | Comp. Ex. 2A | Comp. Ex. 3A |
|---|---|---|---|---|---|---|---|
| First stretching | Stretching temperature (° C.) | 140 | 140 | 136 | 143 | 144 | 144 |
|  | Stretching magnification (times) | 1.3 | 1.5 | 1.5 | 2.1 | 1.2 | 1.5 |
|  | Feeding-out angle (°) | 45 | 45 | 45 | 45 | 37 | 54 |
| Second stretching | Stretching temperature (° C.) | 145 | 145 | 142 | — | 145 | 145 |
|  | Stretching magnification (times) | 2.0 | 2.2 | 2.2 | — | 2.0 | 2.0 |
|  | Feeding-out angle (°) | 45 | 45 | 45 | — | 45 | 44 |
| Thickness (μm) |  | 50 | 39 | 39 | 63 | 54 | 43 |
| Re (nm) |  | 140 | 138 | 137 | 140 | 142 | 142 |
| Orientation angle θ (°) |  | 45 | 45 | 45 | 45 | 45 | 45 |
| Orientation angle fluctuation (°) |  | 0.7 | 0.7 | 0.8 | 1.2 | 1.2 | 1.3 |
| Nz coefficient |  | 1.40 | 1.50 | 1.80 | 1.25 | 1.50 | 1.40 |
| Nz coefficient fluctuation |  | 0.07 | 0.07 | 0.09 | 0.13 | 0.08 | 0.08 |

Example 1B

A pellet of thermoplastic norbornene resin (by Zeon Corporation, ZEONOR 1420, glass transition point of 137° C.), which is a type of alicyclic olefin polymer, was dried at 100° C. for 5 hours.

The pellet was supplied to an extrusion machine, melted in the extrusion machine, extruded from a T-die through a polymer pipe and a polymer filter into a sheet-shaped body on a casting drum, and cooled so as to obtain an unstretched film with a thickness of 130 μm and a width of 1200 mm.

The unstretched film was continuously supplied to a float type longitudinal stretching machine, first stretching was carried out with stretching temperature of 140° C. and stretching magnification of 1.3 times so as to obtain a first stretched film with refractive index difference Δn of 0.0018 and orientation angle $θ_{1B}$ to the take-up direction (longitudinal direction) of 0.1°, and it was taken up by a winding core.

The first stretched film was fed out of the winding core and supplied to a tenter stretching machine shown in FIGS. 1 to 3 with the feeding-out angle $θ_{2B}$=40° to the take-up direction of a second stretched film, second stretching was applied with stretching temperature of 145° C. and stretching magnification of 1.7 times, film both ends were trimmed by 180 mm to obtain the lengthy second stretched film with the width of 1340 mm. The obtained lengthy second stretched film was uniform to the width direction.

The stretching conditions and characteristics of the first stretched film and the second stretched film are shown in Table 2.

A lengthy polarizing plate (by Sanritz Corporatoin, HLC2-5618S, thickness of 180 μm, width of 1340 mm) with a transmission axis in the width direction was bonded with the second stretched film in a roll-to-roll manner so as to have a winding body of a circularly polarizing plate with width of 1340 mm. The circularly polarizing plate cut out of the winding body was installed to replace a polarizing plate on a backlight side of a commercial reflective type liquid crystal display device in VA (Vertical Alignment) mode and incorporated so that the side on which the second stretched film was bonded was arranged on the liquid crystal cell side to produce a reflective type liquid crystal display device. When display characteristics of the obtained liquid crystal display device was visually checked from the front, color fluctuation was not observed on the entire width and display was favorable.

Example 2B

A first stretched film, a second stretched film, a circularly polarizing plate and a reflective type liquid crystal display device were obtained similarly to the Example 1B except the change in the stretching conditions as shown in Table 2. The characteristics of the first stretched film and the second stretched film are shown in Table 2. When the display characteristics of the reflective type liquid crystal display device provided with the circularly polarizing plate using the second stretched film was visually checked from the front, no color fluctuation was observed on the entire width and display is favorable.

Example 3B

A first stretched film, a second stretched film, a circularly polarizing plate and a reflective type liquid crystal display device were obtained similarly to the Example 1B except the change in the stretching conditions as shown in Table 2. The characteristics of the first stretched film and the second stretched film are shown in Table 2. When the display characteristics of the reflective type liquid crystal display device provided with the circularly polarizing plate using the second stretched film was visually checked from the front, no color fluctuation was observed on the entire width and display was favorable.

Comparative Example 1B

The unstretched film as-is was continuously supplied to a tenter stretching machine, and obliquely stretching was applied with the condition shown in Table 2, and the stretched film with the orientation angle θ of 45° to the take-up direction was obtained and taken up by a winding core. The characteristics of the stretched film are shown in Table 2. The stretched film obtained by only one stretching had large fluctuation in the orientation angle or Nz coefficient and insufficient uniformity.

Moreover, the circularly polarizing plate and the reflective type liquid crystal display device were produced similarly to the Example 1B except that the obtained stretched film was used. When the display characteristics of the reflective type liquid crystal display device provided with the circularly polarizing plate using the stretched film was visually checked from the front, color fluctuation was observed in the screen.

Comparative Example 2B

A first stretched film, a second stretched film, a circularly polarizing plate and a reflective type liquid crystal display device were obtained similarly to the example 1B except that first stretching and second stretching were carried out with the conditions shown in Table 2. The characteristics of the first stretched film and the second stretched film are shown in Table 2. The second stretched film had a large orientation angle fluctuation and its uniformity was insufficient. In the reflective type liquid crystal display device provided with the circularly polarizing plate using the second stretched film, color fluctuation was observed in the screen.

Comparative Example 3B

A first stretched film, a second stretched film, a circularly polarizing plate and a reflective type liquid crystal display device were obtained similarly to the Example 1B except that first stretching and second stretching were carried out with the conditions shown in Table 2. The characteristics of the first stretched film and the second stretched film are shown in Table 2. The second stretched film had a large orientation angle fluctuation and its uniformity was insufficient. In the reflective type liquid crystal display device provided with the circularly polarizing plate using the second stretched film, color fluctuation was observed in the screen.

Comparative Example 4B

A first stretched film, a second stretched film, a circularly polarizing plate and a reflective type liquid crystal display device were obtained similarly to the Example 1B except that the first stretching and second stretching were carried out with the conditions shown in Table 2. The characteristics of the first stretched film and the second stretched film are shown in Table 2. The second stretched film had a large orientation angle fluctuation and its uniformity was insufficient. In the reflective type liquid crystal display device provided with the circularly polarizing plate using the second stretched film, color fluctuation was observed in the screen.

Comparative Example 5B

A first stretched film, a second stretched film, a circularly polarizing plate and a reflective type liquid crystal display device were obtained similarly to the Example 1B except that the first stretching and second stretching were carried out with the conditions shown in Table 2. The characteristics of the first stretched film and the second stretched film are shown in Table 2. The second stretched film had a large orientation angle fluctuation and its uniformity was insufficient. In the reflective type liquid crystal display device provided with the circularly polarizing plate using the second stretched film, color fluctuation was observed in the screen.

TABLE 2

| | | Ex. 1B | Ex. 2B | Ex. 3B | Comp. Ex. 1B | Comp. Ex. 2B | Comp. Ex. 3B | Comp. Ex. 4B | Comp. Ex. 5B |
|---|---|---|---|---|---|---|---|---|---|
| First stretching | Stretching temperature (° C.) | 140 | 140 | 138 | — | 140 | 137 | 148 | 136 |
| | Stretching magnification (times) | 1.3 | 1.5 | 1.5 | — | 1.5 | 1.1 | 1.5 | 1.6 |
| | $\Delta n$ ($\times 10^{-3}$) | 1.8 | 2.0 | 2.3 | — | 1.8 | 1.2 | 0.9 | 3.2 |
| | Orientation angle $\theta_{1B}$ (°) | 0.1 | 0.0 | 0.0 | — | 0.0 | 1.2 | 0.3 | 0.3 |
| Second stretching | Stretching temperature (° C.) | 145 | 145 | 140 | 145 | 145 | 145 | 145 | 145 |
| | Stretching magnification (times) | 1.7 | 1.8 | 1.8 | 2.1 | 1.5 | 1.3 | 1.4 | 2.1 |
| | Feeding-out angle $\theta_{2B}$ (°) | 40 | 40 | 40 | 45 | 52 | 40 | 40 | 40 |
| Thickness (μm) | | 59 | 48 | 48 | 63 | 58 | 91 | 62 | 39 |
| Re (nm) | | 140 | 140 | 140 | 140 | 142 | 142 | 142 | 142 |
| Orientation angle $\theta$ (°) | | 45 | 45 | 45 | 45 | 45 | 45 | 45 | 45 |
| Orientation angle fluctuation (°) | | 0.7 | 0.7 | 0.8 | 1.2 | 1.2 | 1.3 | 1.2 | 1.2 |
| Nz coefficient | | 1.40 | 1.60 | 1.90 | 1.25 | 1.70 | 1.30 | 1.50 | 1.50 |
| Nz coefficient fluctuation | | 0.07 | 0.07 | 0.09 | 0.13 | 0.08 | 0.08 | 0.08 | 0.08 |

The invention claimed is:

1. A lengthy stretched film made of a thermoplastic resin, wherein the thermoplastic resin is an alicyclic olefin polymer,
wherein over the width direction of at least 1300 mm,
a value of an orientation angle $\theta$ to a take-up direction is in a range of 40° to 50°;
fluctuation of the orientation angle $\theta$ to the take-up direction is 1.0° or less;
a value of Nz coefficient is in a range of 1.3 to 2.0; and
fluctuation of the Nz coefficient is 0.10 or less.

2. The stretched film according to claim 1, wherein retardation Re in an in-plane direction is in a range of 100 to 300 nm over the width direction of at least 1300 mm.

3. The stretched film according to claim 1, wherein the fluctuation of the retardation Re in an in-plane direction is within 10 nm over the width direction of at least 1300 mm.

4. The stretched film according to claim 1, wherein an average thickness is in a range of 30 to 80 µm and thickness fluctuation is 3 µm or less over the width direction of at least 1300 mm.

5. A manufacturing method of the lengthy stretched film according to claim 1, comprising:
   a step of stretching a lengthy unstretched film made of a thermoplastic resin to obtain a first stretched film A with an orientation angle $\theta_{1A}$ to a take-up direction in a range of 40° to 50°; and
   a step of re-stretching the first stretched film A to obtain a second stretched film A with an orientation angle $\theta_{2A}$ to a take-up direction in a range of $\theta_{1A}+85°$ to $\theta_{1A}+95°$.

6. The manufacturing method of a stretched film according to claim 5, wherein a stretching magnification $R_{1A}$ in the step for obtaining the first stretched film A is 1.3 to 3.0 and the stretching magnification $R_{2A}$ in the step for obtaining the second stretched film A is 1.3 to 3.0.

7. A manufacturing method of the lengthy stretched film according to claim 1, comprising:
   a step of longitudinally stretching a lengthy unstretched film made of a thermoplastic resin to obtain a first stretched film B with an orientation angle $\theta_{1B}$ to a take-up direction in a range of ±1° and a refractive index difference $\Delta n$ in a range of 0.001 to 0.003; and
   a step of tenter-stretching the first stretched film B while feeding it out so that a feeding-out angle $\theta_{2B}$ to a take-up direction of a second stretched film B is $15°<\theta_{2B}<\theta+5°$ to obtain the second stretched film B with an orientation angle $\theta$ to the take-up direction in a range of 40° to 50°.

8. The manufacturing method of the stretched film according to claim 7, wherein a stretching magnification $R_{1B}$ in the step for obtaining the first stretched film B is 1.1 to 2.0 and the stretching magnification $R_{2B}$ in the step for obtaining the second stretched film B is 1.3 to 2.0.

9. A lengthy circularly polarizing plate constituted by laminating the lengthy stretched film according to claim 1 and a lengthy polarizer.

10. A liquid crystal display device comprising a stretched film obtained by trimming the lengthy stretched film according to claim 1.

11. The liquid crystal display device according to claim 10, further comprising a reflective display type liquid crystal panel.

12. A liquid crystal display device comprising a circularly polarizing plate obtained by trimming the lengthy circularly polarizing plate according to claim 9.

13. The stretched film according to claim 1, wherein the content of a residual volatile component is 0.1% by weight or less.

14. The stretched film according to claim 1, wherein a saturated water absorption is 0.03% by weight or less.

* * * * *